June 12, 1962 K. E. FRANCIS ETAL 3,039,046
NUCLEAR MAGNETIC RESONANCE MEASURING DEVICE
Filed June 23, 1960 2 Sheets-Sheet 1
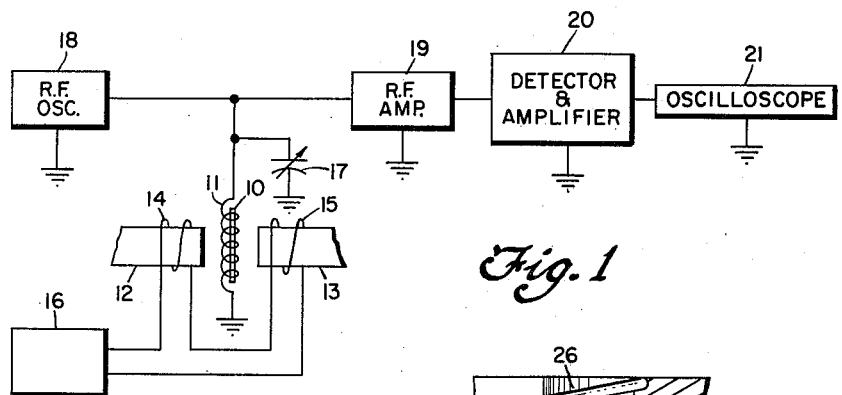
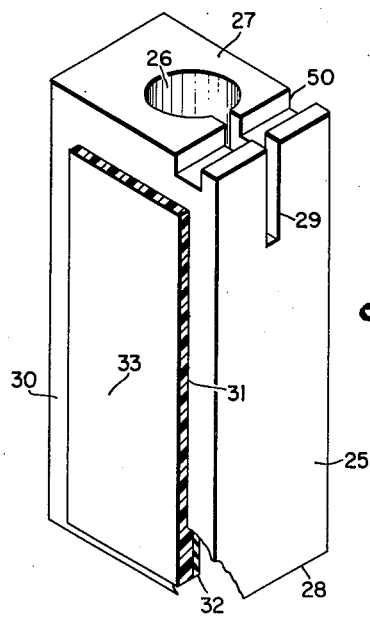
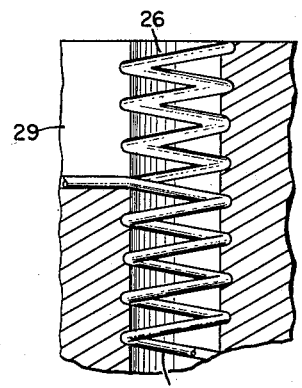
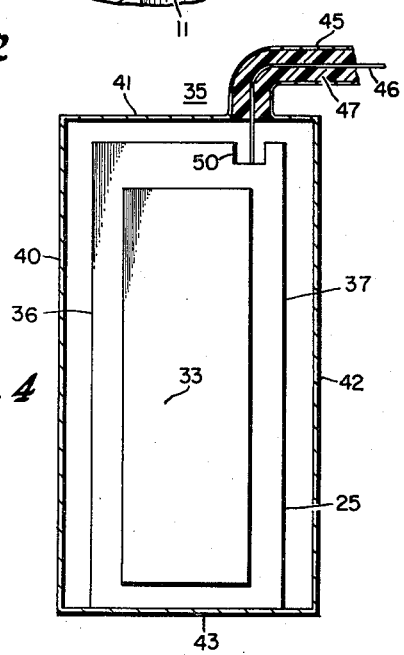
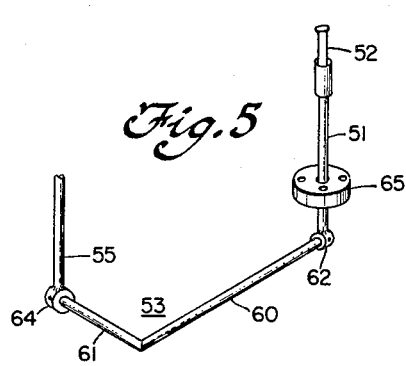
INVENTORS
Kenneth E. Francis
Clyde W. Binkley June 12, 1962  K. E. FRANCIS ETAL  3,039,046
NUCLEAR MAGNETIC RESONANCE MEASURING DEVICE
Filed June 23, 1960  2 Sheets-Sheet 2
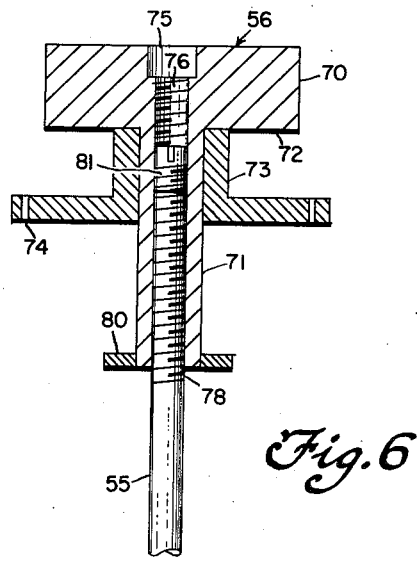
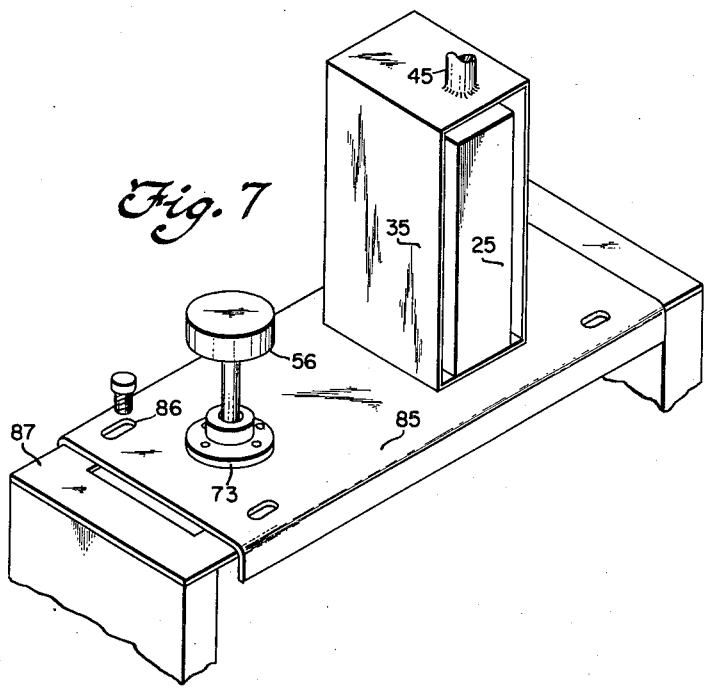
INVENTORS
Kenneth E. Francis
Clyde W. Pinkley

United States Patent Office 3,039,046
Patented June 12, 1962

3,039,046
NUCLEAR MAGNETIC RESONANCE
MEASURING DEVICE
Kenneth E. Francis, Vancouver, Wash., and Clyde W. Pinkley, Columbus, Ohio, assignors to Industrial Nucleonics Corporation, a corporation of Ohio
Filed June 23, 1960, Ser. No. 38,325
6 Claims. (Cl. 324—.5)

This invention relates to nuclear magnetic resonance apparatus, and in particular to an improved sample holder for housing and manipulating a sample under test in such apparatus.

It is well known in the prior art relating to nuclear physics that many atomic nuclei possess magnetic moment and nuclear momentum or "spin." A nucleus having these characteristics displays gyroscopic effects and is therefore often considered analogous to a spining gyroscope having a magnet positioned along its axis.

When such nuclei are subjected to a unidirectional magnetic field, the spinning nuclei initially tend to precess around an axis parallel to the magnetic field. After a period of time, damping forces suppress the nuclear precession enabling the nuclear moments to line up with the magnetic field. In the event the polarized nuclei are subjected to a radio-frequency field at right angles to the magnetic field, nuclear precession is again initiated.

Prior investigators have studied the gyroscopic properties of nuclei by subjecting an element to a magnetic field produced by a permanent magnet and simultaneously irradiating the element with radio-frequency electromagnetic energy emanating from a tank coil. When the frequency of the radio-frequency source resonates with the frequency of nuclear precession, the spinning nuclei absorb a maximum amount of energy from the radio-frequency field thereby loading the tank circuit. It has been determined that the resonant frequency of nuclear precession varies for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present. Apparatus of this type can be used for the quantitative determination of any element the nucleus of which possesses angular momentum and magnetic moment, such as for example, hydrogen, helium, lithium, beryllium, boron, and nitrogen. Additionally, quantitative determination of various isotopes of elements can also be made, because in many cases the different isotopes have different resonant frequencies.

The absorption phenomenon of nuclear magnetic resonance is also used to measure constituent proportions in various compounds. For example, moisture content measurements can be made in materials, such as tobacco, paper, and yarn. In such a determination the water content is not measured directly but, rather, indirectly by the amount of hydrogen present. By applying the same principles it is possible to measure the presence of any compound which contains at least one element the nucleus of which possesses angular momentum and magnetic moment.

In conventional nuclear magnetic resonance apparatus, radio-frequency current from a constant-current source is supplied to a parallel tuned circuit consisting of a coil and capacitor. The tank coil is placed within the uniform field of a permanent magnet so that the radio-frequency field is perpendicular to the magnetic field, and the sample material to be measured or tested is placed within the coil.

The radio-frequency field, or the magnetic field, is modulated at a slow audio rate. When the radio-frequency and the magnetic fields satisfy the relation $W_1 = \gamma H_0$, where "$W_1$" is the angular velocity of the radio-frequency field $H_1$, "$H_0$" is the permanent magnetic field strength in gausses, and "$\gamma$" is a constant dependent on the type of nucleus subjected to resonance, nuclear magnetic resonance occurs. In moisture measurements, the hydrogen nucleus is caused to resonate, and "$\gamma$" equals $2.67 \times 10^4$ sec.$^{-1}$ gausses $^{-1}$.

The resulting nuclear resonance causes a decrease in the impedance of the tank circuit, and therefore a decrease in the voltage appearing across the tank circuit. For a given set of conditions the magnitude of this change in voltage is proportional to the amount of absorbing substance present so that a quantitative measurement can be made.

A principal object of this invention is to provide an improved sample holder for housing the tank coil and manipulating both the coil and sample material located within the coil relative the pole faces of the magnet generating the magnetic field.

Another object is to provide an improved sample holder for manipulating sample material relative the coil generating the radio-frequency magnetic field.

Another object is to provide an improved sample holder that permits convenient position adjustment of the sample coil, both vertically and horizontally.

Another object is to provide an improved sample holder that contains the coil for generating the radio-frequency magnetic field in such a manner that the coil is subjected to a minimum of vibration.

Another object is to provide an improved sample holder that incorporates electrostatic and magnetic flux shielding to prevent pickup of stray radiation and to increase the "Q" of the coil generating the radio-frequency field by decreasing the effect of proximity of pole faces.

In order that all of the features for attaining the objects of this invention may be readily understood reference is herein made to the drawings wherein:

FIG. 1 is a diagram of nuclear magnetic resonance apparatus with which the sample holder of this invention may be employed;

FIG. 2 is a perspective view of a sample holder constructed in accordance with the present invention;

FIG. 3 is a partial sectional view of the sample holder shown in FIG. 2;

FIG. 4 is a transverse section of the sample holder showing the electrostatic shield;

FIG. 5 is a perspective view of a mechanical linkage useful in handling the sample;

FIG. 6 is a sectional view of the operator end of the linkage shown in FIG. 5; and, FIG. 7 is an overall perspective view showing a preferred mounting scheme.

Referring now to the apparatus shown in FIG. 1, sample material 10 under test is positioned in the bore of radio-frequency sampling coil 11, and is thereby subjected to a radio-frequency field. This sample is also subjected to a transverse magnetic field developed in the gap between permanent magnets 12 and 13. Modulation coils 14 and 15 envelop the pole ends of magnets 12 and 13, respectively, so that the otherwise steady magnetic field is amplitude modulated by the audio-frequency energy supplied from modulation source 16.

Capacitor 17 shunts coil 11 so that the combination 11—17 forms a parallel-resonant tank circuit connected to the output of constant-current radio-frequency oscillator 18. The tank circuit is tuned to the oscillator frequency and therefore a substantial radio-frequency voltage appears across the combination 11—17. This voltage has a constant amplitude excepting during those periodic instances at which the output frequency of oscillator 18 and the modulated magnetic field generated by magnets 12 and 13 and modulation coils 14 and 15 satisfy the requirements for nuclear resonance.

During resonance, material 10 absorbs energy from the radio-frequency field so as to periodically load coil 11. As is well known, the loading of a parallel tank circuit lowers the "Q" of the tank, thereby reducing the parallel impedance of the voltage appearing across the tank. The periodic absorption of energy by material 10 amplitude modulates the radio-frequency voltage appearing across tank circuit 11—17. The amplitude of this modulation component varies in accordance with the number of nuclei present to absorb energy from tank coil 11. In the event the signal-to-noise ratio is relatively low, coil 11 is preferably constructed so as to have an elongated form and narrow diameter.

The voltage appearing across tank circuit 11—17 is applied to the input of radio-frequency amplifier 18. The signal output of radio-frequency amplifier 19, is in turn applied to the input of detector and audio-frequency amplifier 20 which has an output connected to oscilloscope 21. A visual read-out of the attainment of the nuclear resonance condition is made by observing the screen of oscilloscope 21.

Referring now to the drawings of the sample holder of this invention shown in FIGS. 2 through 4, the holder comprises a plastic block 25 which in a preferred embodiment has dimensions of 9" x 4" x 16 36/64". Sample hole 26 extends through the body of block 25 with access openings appearing in a pair of opposing sides 27 and 28. In a preferred embodiment hole 26 is drilled through block 25, and this hole is threaded with a #7 pitch as is shown in the cross-sectional front view of FIG. 3.

Coil 11, which generates the radio-frequency magnetic field to which sample 10 is subjected, is housed within the bore formed by hole 26. In a typical installation, radio-frequency coil 11 may be approximately 6" in length and have a diameter of 1⅛" with the individual turns being wound from #12 copper wire. The coil is first wound on a form (not shown) having a diameter smaller than the diameter of sample hole 26. Then the coil is screwed into the threads of hole 26 while still on the form. When the coil is properly positioned so that it is located wholly and midway within the bore of hole 26, the top lead is pulled through slot 29, and the form is removed. The coil is potted into a permanent position relative hole 26 by filling the individual screw threads with epoxy resin cement so as to cover the turns of coil 11.

Side 30 of block 25 is machined so that a rectangular recess 31 is formed therein. A thin sheet 32 of resilient material, such as rubber, is disposed within recess 31 so as to line the bottom of recess 31. In a preferred embodiment, sheet 32 may have a thickness in the order of ⅛". An overlying sheet 33 of nonmagnetic insulating material, such as phenolic, is partially disposed within recess 31 so as to sandwich resilient sheet 32 within the recess.

In the normal condition, when rubber sheet 32 is not subjected to undue compression, sheet 33 projects slightly past the surfaces of side 30; and the placement of block 25 together with sheets 32 and 33 between the pole faces of magnets 12 and 13, results in the compression of resilient sheet 32 so that block 25 is sandwiched tightly between the pole faces. With this arrangement, the block 25 assumes an operating position between the pole faces of magnets 12 and 13 so that sample 10 located within coil 11 is subjected to a transverse magnetic field that is perpendicular to the axial lines of force of the radio-frequency field generated by coil 11 within the bore of the coil. The tension between block 25 and the pole faces of magnets 12 and 13 developed by resilient sheet 32 must, however, be of such a nature that the block can still be moved for positioning in the most uniform part of the permanent magnetic field.

An electrostatic shield 35 is placed around the perimeter of block 25 formed by sides 27, 28, 36 and 37. It should be noted that these sides are defined by block surfaces which are removed, or out of contacting relationship with the pole faces of magnets 12 and 13.

Shield 35 comprises a rectangular metallic ring defined by sides 40, 41, 42 and 43. In a preferred embodiment, the shield is made of a .022" copper sheet. In view of the fact that electrostatic shield 35 is coupled to block 25 so that the surfaces of block sides 30 and 44 are not magnetically shielded, the magnetic lines of force of magnets 12 and 13 are not attenuated by electrostatic shield 35. Shield 35 is a necessary and desirable feature because stray electrostatic fields are readily superimposed or modulated on the radio-frequency carrier which energizes coil 11. These stray fields can cause a substantial decrease in the signal-to-noise ratio of the test signal thereby reducing the accuracy of measurement.

The ground side or lower terminal of coil 11 is connected to side 43 of electrostatic shield 35 at the bottom of block 35. This connection may be a direct solder connection to the shield. A coaxial cable elbow 45 is soldered to the upper side 41 of electrostatic shield 35. Elbow 45, in a preferred embodiment, may be a ½" section of copper tube encasing a conductor 46 of #12 wire placed in the center of the copper tube. Epoxy resin cement is used as dielectric 47 within coaxial elbow 45. The use of a solid copper tube and an epoxy resin, which dries very hard, makes a very rigid coaxial connector element that is free of microphonics. The center conductor of the coaxial connector is soldered to the top lead of radio-frequency coil 11. Block 25 is formed with a cutout 50 so that this soldered connection can be conveniently made.

In many testing and measuring operations, sample 10 is contained within a glass test tube, and the test tube is manipulated relative coil 11 and magnets 12 and 13. Another feature of this invention is directed to the manipulation of test tube 52 relative the bore defined by radio-frequency coil 11. In particular, test tube 52 is seated on plastic sample support rod 51 of manipulating linkage 53. Rod 51 projects through the bottom opening of hole 26 in block 25 so that the upper surface of this rod forms a seat for test tube 52. Linkage 53 connects sample support rod 51 to the test tube metallic removal rod 55. By lifting the test tube removal knob 56, test tube 52 and its enclosed sample 10 can be raised so that the tube and sample can be conveniently removed from within sample coil 11.

A preferred embodiment for linkage bar 53 is shown in FIGS. 5 and 6. In this embodiment, linkage 53 comprises two arms 60 and 61 welded with respect to one another so that a right angle is formed therebetween. Rod 51, the upper end of which supports test tube 52, is fixed relative arm 60 by means of clamp 62. Rod 55 is coupled to the terminal end of linkage arm 61 by means of clamp 64. The test tube removal knob 56 is coupled to the upper end of brass rod 55 in a manner hereinafter outlined in detail. An alignment seat 65 is disposed over the upper end of Teflon rod 51. This seat is coupled to block 25 as hereinafter outlined, and inasmuch as plastic rod 51 forms a slip fit with respect to the center hole of seat 65, the rod is free to slide axially relative seat 65.

A preferred embodiment of test tube removal knob 56 is shown in FIG. 6. This knob comprises a metallic head 70 joined to a reduced elongated shank portion 71. The lower surface 72 of head 70 is supported by a collar 73. Collar 73 is formed with a central bore which receives elongated shank 71. Collar 73 is formed with a pair of holes 74 so that removal knob 56 may be positioned fixedly on a support plate (not shown). Shank 71 and also the portion of head 72 immediately below recess 75 is provided with a threaded hole 76. The threads of this hole mate with corresponding threads 78 formed on the upper portion of metallic removal rod 55.

In the event it is desired to elevate and remove test tube 52 relative block 25, test tube removal rod 56 is manually lifted until stop 80 engages the lower surface of collar 73.

Test tube removal knob 56 also serves another purpose. By rotating the knob relative collar 73, the position of sample 10 can be minutely adjusted to maximum uniform radio-frequency and permanent magnetic fields in the vertical direction. After the most uniform fields are found, a set screw 81, which is located within hole 76 immediately above the upper surface of rod 55, is manually tightened by a screw driver or like device to prevent accidental rotation of knob 56.

Another feature of this invention relates to adjustment of the sample coil 11 in the horizontal direction. Referring now to FIG. 7, horizontal adjusting plate 85 is formed with a plurality of holes 86. Sample block 25 is firmly bolted to plate 85. The mounting holes 86 for plate 85 are slotted so that the plate may slide relative a base support 87, thereby enabling the entire sample block to move in a horizontal direction relative its environmental structure.

It should be understood that the above described structures are merely illustrative, and that modifications can be made without departing from the scope of the invention.

What is claimed is:

1. In nuclear magnetic resonance measuring apparatus for subjecting a sample material to be analyzed to mutually perpendicular magnetic and radio-frequency fields including a resonant tank coil disposed between a pair of magnet pole faces to develop an output signal responsive to a condition of nuclear resonance between the fields and for the sample under test, an improved sample holder comprising a plastic block having a plurality of generally rectangular sides with each pair of opposing sides being generally parallel, said coil being disposed in a hole formed in said block and extending through said block with openings in one pair of said opposed sides, at least one of a second pair of opposed sides being formed with a generally rectangular recess, a thin sheet of resilient material lining the bottom of said recess, a thin sheet of electrical insulating material overlying said sheet of resilient material and projecting out of the associated recess, said block being disposed between the pole faces of said magnet with said sheet of insulating material contacting an associated pole face so as to compress said resilient material sheet, a metallic electrostatic shield enveloping the surfaces of said block removed from said pole faces, a linkage including a sample support rod projecting into said hole to support adjustably the sample material within the coil, a second rod coupled to said linkage at a point remote from said sample support rod, said second rod having a threaded end, and a manipulating knob having an internally threaded bore coupled to the threads of said second rod whereby rotation of said knob varies the positioning of said sample material along the longitudinal axis of said coil.

2. In nuclear magnetic resonance measuring apparatus for subjecting a sample material to be analyzed to mutually perpendicular magnetic and radio-frequency fields including a resonant tank coil disposed between a pair of magnet pole faces to develop an output signal responsive to a condition of nuclear resonance between the fields and for the sample under test, an improved sample holder comprising a plastic block having a plurality of generally rectangular sides with each pair of opposing sides being generally parallel, said coil being disposed in a hole formed in said block and extending through said block with openings in one pair of said opposed sides, at least one of a second pair of opposed sides being formed with a generally rectangular recess, a thin sheet of resilient material lining the bottom of said recess, a thin sheet of electrical insulating material overlying said sheet of resilient material and projecting out of the associated recess, said block being disposed between the pole faces of said magnet with said sheet of insulating material contacting an associated pole face so as to compress said resilient material sheet, a metallic electrostatic shield enveloping the surfaces of said block removed from said pole faces, and a linkage including a rod projecting into said hole to support adjustably the sample material within the coil.

3. In nuclear magnetic resonance measuring apparatus for subjecting a sample material to be analyzed to mutually perpendicular magnetic and radio-frequency fields including a resonant tank coil disposed between a pair of magnet pole faces to develop an output signal responsive to a condition of nuclear resonance between the fields and for the sample under test, an improved sample holder comprising a plastic block having a plurality of generally rectangular sides with each pair of opposing sides being generally parallel, said coil being disposed in a hole formed in said block and extending through said block with openings in one pair of said opposed sides, at least one of a second pair of opposed sides being formed with a generally rectangular recess, a thin sheet of resilient material lining the bottom of said recess, a thin sheet of electrical insulating material overlying said sheet of resilient material and projecting out of the associated recess, said block being disposed between the pole faces of said magnet with said sheet of insulating material contacting an associated pole face so as to compress said resilient material sheet, and a metallic electrostatic shield enveloping the surfaces of said block removed from said pole faces.

4. In nuclear magnetic resonance measuring apparatus for subjecting a sample material to be analyzed to mutually perpendicular magnetic and radio-frequency fields including a resonant tank coil disposed between a pair of magnet pole faces to develop an output signal responsive to a condition of nuclear resonance between the fields and for the sample under test, an improved sample holder comprising a plastic block having a plurality of generally rectangular sides with each pair of opposing sides being generally parallel, said coil being disposed in a hole formed in said block and extending through said block with openings in one pair of said opposed sides, at least one of a second pair of opposed sides being formed with a generally rectangular recess, a thin sheet of resilient material lining the bottom of said recess, and a thin sheet of electrical insulating material overlying said sheet of resilient material and projecting out of the associated recess, said block being disposed between the pole faces of said magnet with said sheet of insulating material contacting an associated pole face so as to compress said resilient material sheet.

5. In nuclear magnetic resonance measuring apparatus for subjecting a sample material to be analyzed to mutually perpendicular magnetic and radio-frequency fields including a resonant tank coil disposed between a pair of magnet pole faces to develop an output signal responsive to a condition of nuclear resonance between the fields and for the sample under test, an improved sample holder comprising a block of non-magnetic material formed with a hole extending through said block and a coil disposed in said hole, a thin sheet of resilient material disposed within a recess formed in said block, and a thin sheet of covering material overlying said sheet of resilient material and projecting out of the recess, said block being disposed between the magnet pole faces with said sheet of insulating material contacting a pole face so as to compress said resilient material sheet.

6. In nuclear magnetic resonance measuring apparatus for subjecting a sample material to be analyzed to mutually perpendicular magnetic and radio-frequency fields including a resonant tank coil disposed between a pair of magnet pole faces to develop an output signal responsive to a condition of nuclear resonance between the fields and for the sample under test, an improved sample holder comprising a block of non-magnetic material formed with a hole extending through said block and a coil disposed in said hole, a thin sheet of resilient material fixed to one surface of said block, and a thin sheet of covering material overlying said sheet of resilient material, said block being disposed between the magnet pole faces with said sheet of covering material contacting an associated pole face so as to compress said resilient material sheet.

References Cited in the file of this patent

UNITED STATES PATENTS

| | | |
|---|---|---|
| 2,911,587 | Bayly | Nov. 3, 1959 |
| 2,913,658 | Burdine | Nov. 17, 1959 |
| 2,917,682 | Kirchner et al. | Dec. 15, 1959 |